United States Patent [19]

Kienzle et al.

[11] 4,281,067

[45] Jul. 28, 1981

[54] METHOD OF POLYMERIZING STYRENE

[75] Inventors: Charles Kienzle, East Brunswick; Stanley E. Gebura, Mountain Lakes; John W. Boghosian, Plainsboro, all of N.J.

[73] Assignee: BASF Wyandotte Corporation, Wyandotte, Mich.

[21] Appl. No.: 176,315

[22] Filed: Aug. 8, 1980

Related U.S. Application Data

[63] Continuation-in-part of Ser. No. 849,904, Nov. 9, 1977.

[51] Int. Cl.$^3$ ................................................ C08J 9/20
[52] U.S. Cl. ............................ 521/56; 260/DIG. 24; 521/96; 521/98; 521/907; 521/146
[58] Field of Search .................. 260/45.7 RL; 521/56, 521/96, 98, 907

[56] References Cited

U.S. PATENT DOCUMENTS

| | | | |
|---|---|---|---|
| 3,058,928 | 10/1962 | Eichhorn et al. | 521/96 |
| 3,058,929 | 10/1962 | van der Hoff et al. | 521/96 |
| 3,093,599 | 6/1963 | Mueller-Tamm et al. | 521/98 |
| 3,819,547 | 6/1974 | Pillar et al. | 521/96 |

*Primary Examiner*—Morton Foelak
*Attorney, Agent, or Firm*—H. Lawrence Jones

[57] ABSTRACT

By using alpha,alpha'-bis-t-butylperoxydiisopropylbenzene (TDB) as an organic peroxide synergist in making expandable polystyrene having a K value of 55–59 and containing an organic bromide reaction mixture compatible with the polymerization (such as hexabromocyclododecane), excellent results are obtained. Specifically, foams of overall improved properties, namely in flammability, collapse and shrinkage, are obtained.

14 Claims, No Drawings

METHOD OF POLYMERIZING STYRENE

CROSS-REFERENCE TO RELATED APPLICATIONS

This application is a continuation-in-part application of copending U.S. patent application Ser. No. 849,904, filed Nov. 9, 1977, for "Method of Polymerizing Styrene."

BACKGROUND OF THE INVENTION

1. Field of the Invention

This invention relates to the making of beads of expandable polystyrene, and in particular, to the making of relatively fine-particle beads of expandable polystyrene which has been modified in composition to improve flame resistance by making the beads with an effective proportion of a suitable organic bromide. Still more particularly, the invention concerns the making of beads of the kind indicated above in which hexabromocyclododecane, tetrabromocyclooctane or tetrabromovinylcyclohexane is used as the organic bromide in conjunction with certain peroxides, and in most instances, it concerns the making of such beads by a suspension polymerization process from, for the most part, monomeric material, although the process is applicable to the making of such fine-particled beads by a practice involving a preliminary formation of the polymer beads and then a subsequent treatment of them with other ingredients to bring them to the desired composition.

2. Description of the Prior Art

There has been, in connection with the usual practice of the prior art, a problem in connection with "shrinkage" and "collapse" of blocks molded from the antiflame-modified expandable-polystyrene beads. The term "shrinkage" refers to the decrease in longitudinal or vertical dimension exhibited by a molded block upon being unmolded and permitted to cool to room temperature. The term "collapse" refers to the extent of inbowing of a central portion of a side of such block. These blocks, which are usually thereafter intended to be cut into slab-like pieces 25 millimeters to 150 millimeters thick and used as insulation boards or the like, are relatively large. Generally, the blocks are on the order of 50 centimeters wide, 124 centimeters high, and 490 centimeters long. The percent of shrinkage can be determined by measuring the length of the product block at room temperature and comparing the dimension obtained with the known interior length dimension of the mold from which the block was produced. The percent of collapse can be determined by positioning a straightedge horizontally along one side of the block, about halfway up its height, and then measuring the distance between the straightedge and the in-bowed surface of the block. The same operation is repeated on the other side. Then, adding the two dimensions so obtained and comparing them with the nominal width of the block, as obtained from the known interior dimensions of the mold from which the block was produced, provides the percent of "collapse."

The collapse and shrinkage problems are not noticed to any particular degree in making of similar products from polystyrene compositions which have not been modified by the inclusion of organic bromide and peroxide synergist. As time goes on, however, the demand in the marketplace has increasingly been for the flame-retardant-modified material rather than the unmodified.

The problems of shrinkage and collapse have been known to be related to the bead size of the modified-composition expandable polystyrene used; there is in any event quite a bit of variability, there is somewhat less of a problem when the beads are larger. Thus, many producers prefer to work with the larger beads, because they provide a lesser degree of collapse and shrinkage. At the same time, however, the relatively larger beads give a product which is sometimes not considered as desirable for aesthetic reasons. Some producers find it necessary to accept the disadvantages (i.e., greater block collapse and shrinkage, and greater scrap losses in the slab-cutting operation) that go with making the desired product from fine-particle beads. The prior art has not indicated any way that these problems can be alleviated without substantially lengthening molding cycles.

Eichhorn et al, U.S. Pat. No. 3,058,928, relates to the field of making self-extinguishing expanded-plastic compositions. The reference teaches the use of organic bromide flame-proofing agents and an organic peroxide as a synergist. The reference requires that the organic peroxide be relatively stable, as indicated by a half-life of at least two hours at 100° C., when tested in benzene. The reference teaches 1,1,2,2-tetrabromoethane as the organic bromide and dicumyl peroxide (DCP) as the peroxide synergist. The reference further teaches that the organic bromide is present at 0.2 to 5 percent by weight, preferably 0.5 to 2 percent by weight, and the peroxide synergist is present at 0.05 to 2 percent by weight, preferably from 0.2 to 1.5 percent by weight, based on the weight of the styrene.

Vanderhoff et al, U.S. Pat. No. 3,058,929, is similar in its teachings to that of the '928 patent.

Pillar et al, U.S. Pat. No. 3,819,547, is a patent in the art of making self-extinguishing expandable polystyrene, which teaches that such compositions are made by incorporating with the styrene 0.2 to 10 percent by weight of hexabromo-2-butene, with or without a peroxide synergist. The reference teaches as an organic peroxide synergist, 1,3-bis(alpha-tert-butylperoxyisopropyl)benzene, which is TBD. However, the reference is distinct herefrom in its teachings of the level of synergist employed. The patent contains no signpost to indicate that there is any advantage in using TBD in place of DCP.

Mueller-Tamm et al, U.S. Pat. No. 3,093,599, teaches making expandable polystyrene compositions which contain 0.5 to 6 percent by weight of organic polybromine compound, such as hexabromocyclododecane (HBCD). The problem of shrinkage or collapse is not discussed.

There is presently existing commercial practice wherein an organic bromide other than HBCD is used, and the K value of the polystyrene is over 60. This yields as a product, polystyrene beads which are relatively free of collapse and shrinkage, but this advantage is accompanied by drawbacks such as the need for increased mold-cycle times and the inconvenience of needing to add the bromide and/or peroxide synergist separately. There is, moreover, need for more storage and/or drying time and/or a slower throughput rate in the step of pre-expanding the beads before molding.

The prior art has not taught how the problem of reduced yield (because of shrinkage and/or collapse) could be alleviated without also accepting other drawbacks such as those mentioned above. In particular, the prior art has never suggested that, by the selection of a particular peroxide synergist, any such result could be obtained.

BRIEF SUMMARY OF THE INVENTION

By using alpha,alpha'-bis-t-butylperoxydiisopropylbenzene (TDB) as an organic peroxide synergist in making expandable polystyrene having a K value of 55 to 59 and containing an organic bromide compatible with the polymerization, excellent results in terms of overall properties of the resulting foam are obtained. In a preferred practice, small amounts of less than 0.06 phr. of TDB are used. The present invention affords a process which provides higher yields, normally obtained when polystyrene of higher K value is used, but avoids certain drawbacks of the process using polystyrene of higher K value, such as longer reaction time and longer mold-cycle time.

DESCRIPTION OF THE PREFERRED EMBODIMENTS

In one aspect, the invention concerns the use, as a synergist with an organic bromide in the making of expandable-polystyrene beads by a suspension-polymerization process, of the compound alpha,alpha'-bis-t-butylperoxydiisopropylbenzene (TDB). Heretofore, dicumyl peroxide (DCP) or the like was the conventional synergist. It has been found that substantially reduced levels of TDB, as compared to DCP, can effectively be employed. Indeed, even with the use of approximately 23 to 90 percent less TDB, as compared to DCP, results at least substantially equivalent, if not slightly superior, are obtained in respect to such factors as pressure-release time, fire retardance, and expansion rate, while superior results are obtained in respect to shrinkage or collapse of parts molded from the expandable polystyrene so produced. In the block-molding industry, this avoidance of collapse and shrinkage is a very important consideration, directly influencing the raw-material cost in an industry which is raw-material-intensive.

As shown by the prior art indicated above, expanded polystyrene is made by known techniques. For example, one known process contemplates the practice whereby styrene or the like is suspended in an aqueous phase and polymerized with the use of a free-radical initiator, using also heat, as necessary or desired. U.S. Pat. No. 3,058,929, noted above, teaches the desirability of including in the suspension-polymerization reaction mixture as a synergist, a quantity of an organic peroxide, ordinarily DCP or hydroperoxide, which is relatively stable, i.e., one which exhibits, when tested in benzene at 100° C., a half-life on the order of at least 5 hours.

After the beads are made and, if desired, coated with hydrophobic materials, the next step, in the total process of converting styrene monomer and other ingredients to a finished article of expanded styrene, is the pre-expansion step. In this step, the beads of polystyrene are fed into an apparatus such as that disclosed in U.S. Pat. No. 3,973,884 to Terminiello. In the pre-expansion, the beads are subjected to the action of steam to a controlled extent. This causes a substantial portion of the pentane or blowing agent contained therein to become volatilized. Concomitantly, the softened polymer is reduced in bulk density to a value on the order of 1 pound per cubic foot (16 grams per liter), i.e., a value substantially closer to the density of the fully expanded polystyrene in its final form.

Although it is most common to use pentane as a blowing agent, other materials may be used, such as another saturated aliphatic hydrocarbon containing from 4 to 7 carbon atoms in the molecule, or a perchlorofluorocarbon, the compound preferably having a molecular weight of at least 58 and a boiling point no higher than 95° C. at 760 millimeters of mercury absolute pressure and being a non-solvent for the polymer. Examples of suitable substitutes for pentane include isopentane, neopentane, n-butane, isobutane, hexane, heptane, petroleum ether, etc., or any of the various perchlorofluorocarbons mentioned in U.S. Pat. No. 3,058,929. Mixtures of any two or more such agents or compounds can also be used. Such materials are usually used at a rate equivalent, on a mole-for-mole basis, with the use of 3 to 20 percent by weight, preferably 5 to 8 percent by weight, of pentane.

In connection with the expansion, it is important that it be possible to maintain a satisfactory rate of throughput. In the case of a common Rodman No. 2 cylindrical expander, and working with beads ranging in size from 0.4 millimeter to 2 millimeters, it is commercially desirable to be able to maintain a rate of expansion on the order of 200 pounds (90.7 kilograms) per hour or greater. The rate at which the pre-expansion operation can be conducted depends upon a number of factors, such as the volatiles content (water plus blowing agent) of the beads, bead size, and amount of available steam.

Thereafter, the expanded beads are aged and then fed into a mold. The system is sealed, and steam is introduced at a line pressure, such as 20 to 100 pounds per square inch gauge (2.36 to 7.8 atmospheres absolute). The steam enters into a steam chest in which there is situated a pressure-sensitive gauge which will cut off the steam when the pressure in the chest rises to some preselected value of back pressure, such as 8 to 15 pounds per square inch gauge (1.545 to 2.02 atmosphere absolute). Then, after the pressure in the chest drops to a suitably low value (about 1 pound per square inch gauge, or 1.07 absolute atmosphere, for example), the system is opened and the ejector members which are usually provided in the sides of the mold are activated to eject the finished block. The expression "pressure release time" (PRT) is the length of time in minutes between the closing of the steam supply and the reaching of the desired low pressure in the steam chest. It is desirable for the PRT to be as short as possible. In the making of large blocks having dimensions such as 16 feet by 4 feet by 20 inches (4.9 meters by 2.45 meters by 0.508 meter), a pressure release time on the order of 1.5 to 15 minutes is usual.

In connection with the making of articles such as insulation board or the like, which may be made by producing a large block of expanded polystyrene which is aged and then hot-wire cut into slices, it is particularly important that the block which is initially molded not shrink or collapse any more than is necessary. The extent of collapse and shrinkage influences the amount of scrap which is produced in the hot-wire cutting operation and the number of complete slices which can be obtained from a given block. The terms "collapse" and "shrinkage" have been explained hereinabove. When the present invention is practiced, it is frequently possible to reduce the percentage of collapse to a value of about ½ to ⅓ of that observed when following the practices of the prior art.

Although the invention has been indicated above as being principally useful when the bromide-modified expandable-polystyrene particles are relatively fine-particled (about 1.5 millimeters in maximum dimension or less, preferably 1.0 millimeter or less), the invention is also of use when the particles are somewhat larger (up to about 5 millimeters in maximum dimension).

In this regard, attention is to be paid to the rather surprising effectiveness of the TDB when it is used at a low rate, such as 0.06 part per hundred of resin (phr), as compared to the prior art practice of using 0.1 part to 2.0 parts per hundred of resin of dicumyl peroxide. Although the TDB is higher in cost per unit of weight, the fact that it can be used so sparingly means that it is possible to realize the cost saving, in comparison with the prior art practice of using dicumyl peroxide at the level of 0.2 part per hundred of resin, and this advantage is obtained, whether the beads are particularly small or not.

The TDB is, generally, employed in an amount ranging from about 0.01 to about 0.15 part by weight thereof, per hundred parts by weight of styrene. Preferably, the TDB is present in an amount ranging from about 0.03 to 0.06 part by weight per hundred parts by weight of styrene.

Those skilled in the art will appreciate that the expression "a polymerizable composition containing a major portion of styrene" is to be understood as covering not only compositions wherein styrene is the only monomer but also those in which there are included minor amounts of other compatible monomers such as acrylonitrile and butadiene.

In place of hexabromocyclodecane, there may be used another organic bromide which is also compatible with the suspension-polymerization reaction mixture. As taught in U.S. Pat. No. 3,093,599, organic bromides which do not inhibit the polymerization of styrene include HBCD, tetrabromocyclooctane, tetrabromovinylcyclohexane and mixtures thereof. Use of such a reaction-compatible bromide tends to give a polymer of lower K value than would otherwise be obtained, because of chain-transfer activity of such bromides. The proportion of such bromide to be used is related to the weight ratio of bromine to resin. Satisfactory results are generally obtained with a range equivalent to the use of approximately 0.4 part to 2 parts by weight per hundred parts of styrene.

Although the present invention is particularly directed to the use of TDB, it is contemplated that other peroxide synergists generally corresponding to the formula:

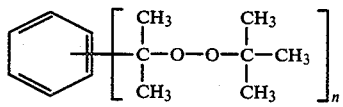

wherein n equals 2 or 3, may be employed herein.

In order to be an equivalent substitute for TDB, such other peroxides must evidence the same low level amounts as TDB. Furthermore, such equivalents must have a half-life long enough not to participate in the reaction to any substantial extend, i.e., a half-life of about 500 hours or greater when tested at 100° C. in benzene. A suitable proportion may be chosen on the basis of stoichiometry, considering the peroxide functionality of the substance chosen, observing ranges equivalent to the range of TDB indicated above. But in particular, it will be desirable to have an organic peroxide which is at least substantially as stable as TDB (half-life of 12.5 hours at 130° C. in benzene, versus 1.9 hours for dicumyl peroxide) and in respect to peroxide, an equivalent weight of about 170 or less. In accordance with the gist of the invention, a different di-, tri-, or tetrafunctional peroxide with a half-life in benzene at 130° C. of 100 hours and a lower equivalent weight may be used herein. Thus, a compound such as

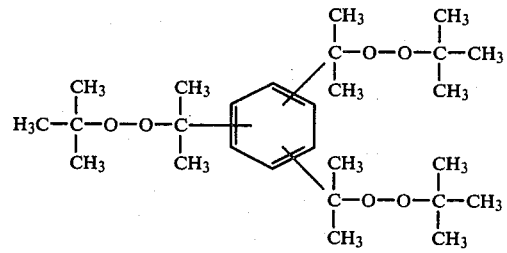

which may evidently be made from triisopropenylbenzene and t-butyl hydroperoxide by following an acid-catalysis procedure as taught in *Chemical Abstracts* Vol. 61, column 4270+, can be expected to exhibit desirable activity for the use-area of the present invention. It has higher molecular weight and a lower peroxide equivalent weight, two ways in which alpha,alpha'-bis-t-butylperoxydiisopropylbenzene differs from dicumyl peroxide, and is of a structure so generally similar (one extra t-butylperoxyisopropyl group) that it is expected also to be stable and useful.

The organic phase may also contain minor amounts of other ingredients such as a select amount of a Fischer-Tropsch wax having a congealing point of 92° C., as disclosed in the co-pending U.S. patent application of Herbert Gahmig, Ser. No. 805,377, filed June 10, 1977, the disclosure of which is hereby incorporated by reference.

As a suspending agent, there may be used polyvinylpyrrolidone, or other substances such as polyvinyl alcohol, hydroxyethyl cellulose, hydroxymethyl cellulose, etc., or another suitable organic suspending agent, or inorganic suspending agents, such as tricalcium phosphate or bentonite.

The free-radical initiator(s) may be added in the aqueous phase, rather than in the monomer or organic phase.

The polymerization is usually conducted under conditions which yield a molecular weight corresponding to a K value on the order of 58 to 59, although K values as low as about 55 or as high as about 60 may be used in some circumstances. Those skilled in the art will understand how to select suitable conditions of time and temperature, taken together with such other adjustable parameters as the rate of agitation and the time of addition of suspending agent, in order to produce material of the desired particle size and degree of polymerization. In general, there is practiced an initial heating up, which may be done smoothly or stepwise, followed by another period, as long as 25 hours, of holding at an advanced temperature, on the general order of 80° C. to 115° C. Conditions may vary, depending upon the identity and concentration of the monomer and of the free-radical initiator selected.

Although in accordance with practices of the prior art, it was common to achieve values of 1.5 to 2.5 percent with respect to shrinkage and values of 6 to 12 percent with respect to collapse, with the system of the invention, it is usual to obtain values of 1.5 percent or less for shrinkage and 5 percent or less for collapse. Although in some cases greater values are encountered, the process of the invention usually significantly reduces the extent of collapse by about 30 percent and possibly by as much as 50 percent, under otherwise identical molding conditions.

The invention indicated above is further illustrated by the following specific examples and comparison tests, in which parts are by weight unless otherwise indicated.

EXAMPLE 1

Expandable polystyrene beads were produced from a solution of 0.6 part HBCD, an organic bromide, 0.06 part of TDB as the peroxide, 0.2 part to 1.0 part of a free radical catalyst, 0.2 part Fischer-Tropsch wax, about 8 parts of pentane, and a minor amount of polystyrene in 100 parts styrene which has been suspended, using vigorous stirring, in 100 parts water to which one part of a dispersing agent had been added. Polymerization was effected in a nitrogen atmosphere by heating the solution to 115° C. over an 8 hour period, then reacting for 5 more hours at that temperature, and then cooling to 30° C.

Beads so made were expanded by being subjected to steam to yield expanded beads, which were thereafter molded to blocks of 8 foot (2.44 meter) length.

The above procedure was repeated varying the parts of the peroxide, TDB, and substituting for TDB, a conventional peroxide, dicumyl peroxide, DCP.

A vertical flammability test was conducted on the molded blocks. Samples were made from the molded blocks of 8 inches by 2 inches by 1 inch, conditioned 7 days at 70° C., brought to room temperature and fastened vertically 3 inches above a Bunsen burner 2. The burner was ignited to have a 6 inch blue, coneless flame. The burner flame was placed below the sample for 3 seconds and then removed. The time evolved between removing the burner flame and sample extinguishment was recorded.

The molded blocks were measured to determine percent collapse. The percent collapse is determined by (a) positioning a straightedge horizontally along one side of the block about half-way up its height, (b) measuring the distance between the straightedge and the in-bowed surface of the block, (c) repeating the operation on the other side of the block, (d) adding the two dimensions so obtained and (e) dividing the result by the interior mold width. The result is then multiplied by 100 to obtain percent collapse.

The results presented in Table I show that the systems of the invention exhibit improved collapse and flame retardance.

TABLE I

| Organic Bromide, part, HBCD | 0.6 | 0.6 | 0.6 |
|---|---|---|---|
| Peroxide, part | 0.06 TDB | 0.03 TDB | 0.2 DCP |

TABLE I-continued

| Large Beads, Collapse, % | 5.3 | 5.3 | 6.6 |
|---|---|---|---|
| Smaller Beads, Collapse, % | 3.5 | 2.5 | 4.7 |
| Vertical Flammability, sec. Mean | 1.1 | 1.1 | 0.8 |
| Standard Deviation | 0.5 | 0.4 | 0.2 |
| UL 94 Flammability, sec. Mean | 3.0 | 3.9 | 2.9 |
| Standard Deviation | 0.5 | 0.7 | 0.5 |
| Samples Igniting Cotton, % | 2.5 | 2.5 | 7.5 |

EXAMPLES 2-12

The procedure described in Example 1 was repeated varying the amounts of bromide and peroxide. As the results in Table II demonstrate, the systems of the subject invention exhibit improved flame retardant properties.

TABLE II

| Example | 2 | 3 | 4 | 5 | 6 | 7 | 8 | 9 | 10 | 11 | 12 |
|---|---|---|---|---|---|---|---|---|---|---|---|
| Organic Bromide, part HBCD | 0.45 | 0.45 | 0.45 | 0.45 | 0.50 | 0.50 | 0.50 | 0.50 | 0.64 | 0.64 | 0.64 |
| Peroxide part TDB | 0.00 | 0.03 | 0.06 | 0.09 | 0.00 | 0.03 | 0.06 | 0.09 | 0.00 | 0.03 | 0.06 |
| Flammability, seconds Mean | 9.1 | 1.1 | 1.0 | 0.9 | 6.2 | 0.9 | 1.0 | 0.9 | 1.2 | 0.9 | 0.8 |
| Standard Deviation | 11.2 | 0.5 | 0.6 | 0.2 | 10.3 | 5.3 | 1.3 | 0.6 | 6.3 | 0.4 | 0.2 |

EXAMPLES 13-15

The procedure described in Example 1 was duplicated with the exception that different peroxides and/or bromides were employed. The results are presented in Table III in which the following abbreviations are used.
TBCO—tetrabromocyclooctane
TBVC—tetrabromovinylcyclohexane
TDB—alpha,alpha'-bis-t-butylperoxydiisopropylbenzene

TABLE III

| Example | 13 | 14 | 15 |
|---|---|---|---|
| Organic Bromide, part | TBCO 0.6 | TBCO 0.6 | TBVC 0.6 |
| Peroxide, part TDB | 0.06 | 0.03 | 0.06 |
| Vertical Flammability, seconds Mean | 0.6 | 0.7 | 1.0 |
| Standard Deviation | 0.2 | 0.2 | 0.4 |
| UL 94 Flammability, seconds Mean | 2.3 | 2.0 | 2.8 |
| Standard Deviation | 0.6 | 0.5 | 0.8 |
| Samples Igniting Cotton, % | 5.0 | 2.5 | 5.0 |

EXAMPLES 16-18

In this example, a comparison is made between (a) the system of the present invention, (b) a system containing as the peroxide ingredient, dicumylperoxide (DCP) and (c) a system containing as the bromide ingredient monochloropentabromocyclohexane (MCPB). All foams had a density of one pound per cubic foot. As the results in Table IV indicate, the best overall system was obtained using the synergistic system of the present invention. Using conventional bromides did not provide the desired flammability while conventional peroxides do not provide either as good collapse or flammability.

TABLE IV

| Example | 16 | 17 | 18 |
|---|---|---|---|
| Organic Bromide, part | 0.64 HBCD | 0.64 MCPB | 0.64 HBCD |
| Peroxide, part | 0.06 TDB | 0.06 TDB | 0.06 DCP |

TABLE IV-continued

| Example | 16 | 17 | 18 |
| --- | --- | --- | --- |
| Smaller Beads, shrinkage % | 1.8 | 1.8 | 1.7 |
| Larger Beads, shrinkage % | 1.3 | 1.4 | 1.4 |
| Smaller Beads, collapse % | 3.5 | 3.4 | 5.6 |
| Larger Beads, collapse % | 5.3 | 5.4 | 8.2 |
| Flammability, seconds | | | |
| Mean | 0.8 | 0.8 | 1.0 |
| High | 1.5 | 8.1 | 2.6 |
| Low | 0.2 | 0.3 | 0.5 |

The embodiments of the invention in which an exclusive property or privilege is claimed are defined as follows:

1. A method for manufacturing a flame-retardant expandable polystyrene bead product, comprising polymerizing a polymerizable composition containing a major portion of styrene in the presence of a blowing agent, the polymerizable composition containing from about 0.4 part to about 2.0 parts by weight per 100 parts by weight of styrene, of an organic bromide selected from the group consisting of hexabromocyclododecane, tetrabromocyclooctane, tetrabromovinylcyclohexane, and mixtures thereof and from about 0.01 part to about 0.15 part by weight per 100 parts by weight of styrene, of an organic peroxide synergist corresponding to the formula:

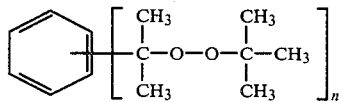

wherein n equals 2 or 3, and wherein the composition is polymerized to a K value of 55 to 59, the bead product having a moisture content of from about one-half to one percent by weight based on the weight of the product.

2. A method as defined in claim 1, wherein said peroxide is alpha,alpha'-bis-t-butylperoxydiisopropylbenzene.

3. A method as defined in claim 2, wherein the amount of peroxide used is from about 0.01 to about 0.09 part by weight, per 100 parts by weight of styrene.

4. A method as defined in claim 2, wherein the amount of peroxide used is from about 0.03 to about 0.06 part by weight, per 100 parts by weight of styrene.

5. A method as defined in claim 1, wherein said bromide is hexabromocyclododecane.

6. A method as defined in claim 5, wherein said peroxide is alpha,alpha'-bis-t-butylperoxydiethylpropylbenzene.

7. A method as defined in claim 6, wherein the amount of peroxide used is from about 0.01 to about 0.09 part by weight, per 100 parts by weight of styrene.

8. A method as defined in claim 6, wherein the amount of peroxide used is from about 0.03 to about 0.06 part by weight, per 100 parts by weight of styrene.

9. A method as defined in claim 1 wherein said bromide is tetrabromocyclooctane.

10. A method as defined in claim 9 wherein said peroxide is alpha,alpha'-bis-t-butylperoxydiethylpropylbenzene.

11. A self-extinguishing expandable polystyrene polymer composition comprising a styrene polymer with a moisture content of one-half to one weight percent and a K value of 55 to 59, 0.4 to 2.0 percent by weight, based on the weight of the styrene, of an organic bromide selected from the group consisting of hexabromocyclododecane, tetrabromocyclooctane, tetrabromovinylcyclohexane, and mixtures thereof; 3 to 20 weight percent, based on the weight of the styrene, of an organic blowing agent, and 0.01 to under 0.15 weight percent, based on the weight of the styrene, of an organic peroxide synergist of the formula:

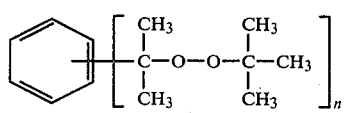

wherein n equals 2 or 3.

12. The composition of claim 11, wherein said organic bromide is hexabromocyclododecane.

13. The composition of claim 12, wherein said synergist is alpha,alpha'-bis-t-butylperoxydiisopropylbenzene.

14. The composition of claim 13, wherein said synergist is present in an amount of from about 0.03 to about 0.09 weight percent, based on the weight of the styrene.

* * * * *

UNITED STATES PATENT AND TRADEMARK OFFICE
CERTIFICATE OF CORRECTION

PATENT NO. : 4,281,067
DATED : July 28, 1981
INVENTOR(S) : Charles Kienzle, Stanley E. Gebura and John W. Boghosian It is certified that error appears in the above-identified patent and that said Letters Patent are hereby corrected as shown below:

In column 10, line 7, after "is" to line 8 before the period (1) delete "alpha,alpha'-bis-t-butylperoxydiethylpropylbenzene" and substitute therefor --alpha,alpha'-bis-t-butylperoxydiisopropylbenzene--.

In column 10, at line 18, after "is" to line 19, before the period (.) delete "alpha,alpha'-bis-t-butylperoxydiethylpropylbenzene" and substitute therefor --alpha,alpha'-bis-t-butylperoxydiisopropylbenzene--.

Signed and Sealed this

Fifteenth Day of December 1981

[SEAL]

Attest:

Attesting Officer

GERALD J. MOSSINGHOFF

Commissioner of Patents and Trademarks